(No Model.)
J. R. BRYDEN.
SANITARY APPARATUS.
No. 347,568. Patented Aug. 17, 1886.
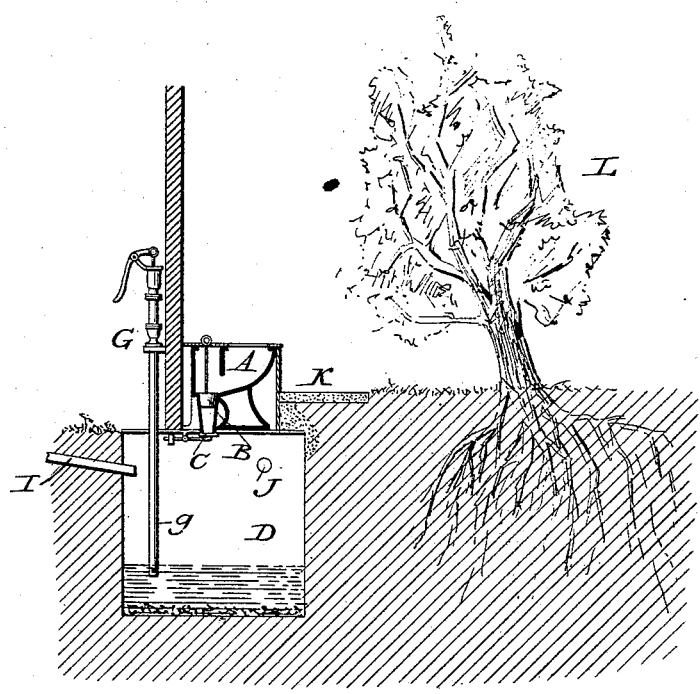
Attest.
Inventor.
J. R. Bryden
By his Atty
P. T. Dodge.

UNITED STATES PATENT OFFICE.

JOHN ROBERT BRYDEN, OF GEORGETOWN, BRITISH GUIANA.

SANITARY APPARATUS.

SPECIFICATION forming part of Letters Patent No. 347,568, dated August 17, 1886.

Application filed September 22, 1884. Serial No. 143,730. (No model.)

*To all whom it may concern:*

Be it known that I, JOHN ROBERT BRYDEN, of Lot 15, Lacy Town, Georgetown, British Guiana, have invented certain new and useful Improvements in Sanitary Apparatus, of which the following is a specification.

This invention is designed for the disposal and utilization of human and stabled-animal excrements, consisting of apparatus for the receiving of excrements in reservoirs in which atmospheric air is excluded, whereby a natural chemical process ensues in the transforming of the excrements into liquid manure, which is disposed of by assimilation into the vegetable kingdom, or collected from the primary reservoirs, or by secondary reservoirs, for utilization as a commercial product.

Introductory: My theory with its practical outcome is based on a natural chemical process that ensues when excrements are placed in contact with the earth in air-tight vessels or reservoirs from which the atmospheric air is excluded. During this natural chemical process certain physical laws are called into requisition by the arrangement of suitable apparatus which convert most of the excrementitious offal into a supernatant limpid liquid manure containing nearly all the valuable constituent elements of the excrements. This liquid manure, being the food for plant life prepared in nature's laboratory, is utilized by assimilation into the vegetable kingdom through the roots of plants, and consequently is a far more efficient manure for plants, when used as a subsoil manure, than any of the dry manures that are applied to the surface of soils, and do not penetrate sufficiently far beneath the surface to reach the roots, and consequently lose most of the volatile constituents before they can be assimilated into vegetation, the roots of the plants being unnaturally turned upward in search of their food instead of being directed laterally and downward to give strength and stability and vigor to the plant. The depth of the rich alluvial soil can be regulated by the depth of the apparatus for the subsoil manure irrigation. The supernatant limpid liquid manure can be withdrawn into suitable air-tight vessels, to be sold for horticultural or agricultural purposes, or may be manufactured into various chemicals—as salts of ammonia, &c.—the liquid manure being charged with all the nitrogenous constituents and the volatile ammonia of the excrements.

The figure is a vertical cross-section through a plantation-closet constructed in accordance with my invention.

A is the bowl. This bowl is preferably an earthenware, concrete, or iron receptacle or basin having one or more plug-valves, B, through which the excrements are passed into the reservoirs beneath. The internal construction of these basins for the reception of the human excrements are made with sufficient concavity and gravitation toward the plug-valves, as illustrated in drawing, as will facilitate its being rapidly and thoroughly cleansed by the withdrawal of the plug from the valve, aided by a douche from a bucket or ball water-tap with elastic pipe and nozzle attachment, or ordinary water-closet attachment, whenever water-supply with pressure can be obtained. No more water must be used than is necessary for cleansing purposes, as a surcharge of water would adulterate the liquid manure.

B is a plug, an essential to prevent the admission of atmospheric air into the underground reservoirs, where the automatic and natural chemical process is carried on; C, a valve; D, primary reservoir or tank. This tank in plantations has no bottom except the earth, so as to allow the liquid manure to slowly percolate through the soil. It is best to place this closet on rising ground, if possible, and surrounded by garden or rich arable land. A tank four by four by four feet is ample in Guiana plantations, if the soil be moderately porous, for the excrementitious matter of twenty-five people.

G is a pump used to pump out liquid manure for sale or other use through pipe *g*; I, trapped pipe leading from stable, dung-heap, or other place, bringing urine or other liquid-manure drainage into the cistern; J, inlet from house-closet, improved in ventilation, and soil-pipe to insure cleanly collection of excrements at mouth of inlet J, trapped by a sluice-valve. (Not shown.) I and J discharge into bowl A, the collected excrements, fæces and fluid, passing through plug-valve B and valve C into primary reservoir, D K, surrounding concrete pavement; L, shrub carrying its roots down into the subsoil to take in the liquid manure.

I claim as my invention—

1. In an apparatus for the conversion of excremental or fecal matter into liquid manure, a receiving chamber or reservoir closed against the external atmosphere, but communicating at the bottom with the soil.

2. In an apparatus for the conversion of fecal matter into liquid manure, a tight chamber formed in the earth and open at the bottom to the soil, in combination with a valve through which the matter may be introduced at the top, and communication with the atmosphere prevented.

3. In an apparatus for converting fecal matter into liquid manure, a chamber formed in the earth, its walls impervious and its base formed by the soil, in combination with an inlet-valve at the top.

4. The chamber or reservoir having its bottom formed by the soil, in combination with the bowl or closet A and the intermediate valve, B.

5. The closed chamber having its bottom in communication with the soil, in combination with the exhaust-pipe g, terminating at a distance from the bottom below the fluid-level.

6. The chamber or reservoir D, in combination with the bowl or closet and the two intermediate valves, B and C.

In testimony whereof I have signed my name to this specification in the presence of two subscribing witnesses.

JOHN ROBERT BRYDEN,
Lot 15, Lacy Town, Georgetown, British Guiana.

Witnesses:
A. E. MANNING,
WM. A. PARKER,
Clerks in the Registrar's Office of British Guiana.